(12) United States Patent
Meier et al.

(10) Patent No.: US 12,337,555 B2
(45) Date of Patent: Jun. 24, 2025

(54) METHOD OF PRODUCING A REINFORCEMENT ELEMENT

(71) Applicant: SIKA TECHNOLOGY AG, Baar (CH)

(72) Inventors: Michael Meier, Niederrohrdorf (CH); Hakim Benouali, Watermael-Boitsfort (BE); Denis Souvay, Illkirch (FR); Loic Zingraff, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/914,005

(22) PCT Filed: May 7, 2021

(86) PCT No.: PCT/EP2021/062187
§ 371 (c)(1),
(2) Date: Sep. 23, 2022

(87) PCT Pub. No.: WO2021/224470
PCT Pub. Date: Nov. 11, 2021

(65) Prior Publication Data
US 2023/0132019 A1 Apr. 27, 2023

(30) Foreign Application Priority Data
May 8, 2020 (EP) .................................. 20173729

(51) Int. Cl.
*B29C 70/52* (2006.01)
*B29C 70/54* (2006.01)
(Continued)

(52) U.S. Cl.
CPC ............ *B29C 70/52* (2013.01); *B29C 70/545* (2013.01); *B62D 29/04* (2013.01);
(Continued)

(58) Field of Classification Search
CPC ....................................................... B29C 70/52
See application file for complete search history.

(56) References Cited

U.S. PATENT DOCUMENTS

2018/0037703 A1* 2/2018 Richardson ............. B29C 44/02
2019/0106157 A1 4/2019 Niggemann et al.
(Continued)

FOREIGN PATENT DOCUMENTS

| EP | 3466800 A1 | 4/2019 |
|---|---|---|
| WO | WO-2011/134943 A1 * | 11/2011 |
| WO | 2019/145503 A1 | 8/2019 |

OTHER PUBLICATIONS

Sep. 6, 2021 International Search Report issued in International Patent Application No. PCT/EP2021/062187.
(Continued)

*Primary Examiner* — Jeffry H Aftergut
(74) *Attorney, Agent, or Firm* — Oliff PLC

(57) ABSTRACT

A method of producing a reinforcement element for reinforcing a structural element in a motor vehicle includes the following steps: pultruding a support element having a longitudinal axis that extends, when in use, along a longitudinal axis of the structural element, the support element having a plurality of outer faces that extend in the direction of the longitudinal axis; placing an adhesive on at least one of the outer faces of the support element; and cutting the pultruded support element to size.

11 Claims, 3 Drawing Sheets

(51) Int. Cl.
*B62D 29/04* (2006.01)
*B29K 77/00* (2006.01)
*B29L 31/30* (2006.01)
*B62D 27/02* (2006.01)

(52) U.S. Cl.
CPC ....... *B29K 2077/00* (2013.01); *B29L 2031/30* (2013.01); *B62D 27/026* (2013.01)

(56) References Cited

U.S. PATENT DOCUMENTS

2019/0126571 A1 5/2019 Plagemann et al.
2021/0237377 A1* 8/2021 Richardson ............. B29C 70/52

OTHER PUBLICATIONS

Nov. 8, 2022 International Preliminary Report on Patentability issued in International Patent Application No. PCT/EP2021/062187.

* cited by examiner

METHOD OF PRODUCING A REINFORCEMENT ELEMENT

The invention relates to a method for producing a reinforcing element for reinforcing a structural element in a motor vehicle.

Components, for example bodies and/or frames of transportation and conveyance means, in particular of aquatic or terrestrial vehicles or of aircraft, frequently have structures with cavities in order to make lightweight constructions possible. However, these cavities cause a wide variety of problems. Depending on the nature of the cavity, it must be sealed to prevent the ingress of moisture and dirt, which can lead to corrosion of the components. It is often also desirable to substantially reinforce such cavities, and thus the component, but to retain the low weight. Furthermore, it is also necessary in some cases to stabilize the cavities, and thus the components, in order to reduce noises which would otherwise be transmitted along or through the cavity.

For this reason, use is made in particular in automotive engineering, but also in aeronautical and marine engineering, of reinforcing elements (also "reinforcers"), among other things, in order to reinforce cavities. A known approach for producing such reinforcing elements is to injection mold a carrier in a two-component injection molding method and to injection mold an expandable adhesive as second component on an outer side of this carrier. Such reinforcing elements are inserted into cavities in structural elements, where the adhesive then expands under the action of heat and as a result adhesively bonds the carrier element to the structural element.

A disadvantage of such and similar known reinforcing elements or methods for producing reinforcing elements is that the material of the carrier can be a limiting element in the overall system in terms of the mechanical stability. However, the injection molding method mentioned above limits the choice of material for the carrier material, such that here it cannot be optimized as desired in terms of mechanical stability. Specifically in regions of crash-relevant structures, however, the mechanical stability of the system is of great importance, since as high as possible a mechanical stability is desirable for such applications.

The invention is therefore based on the object of providing an improved method for producing a reinforcing element which in particular makes it possible to manufacture reinforcing elements with improved mechanical stability. In addition, the method according to the invention for producing a reinforcing element allows reinforcing elements to be produced efficiently and in a cost-optimized manner.

This object is achieved by a method for producing a reinforcing element for reinforcing a structural element in a motor vehicle, the method comprising the following steps: pultruding a carrier element, which has a longitudinal axis extending along a longitudinal axis of the structural element in a use state, wherein the carrier element has multiple outer surfaces extending in the direction of the longitudinal axis; arranging an adhesive on at least one outer surface of the carrier element; and cutting the pultruded carrier element to length.

First of all, this solution has the advantage that pultruding the carrier element makes it possible to produce carrier elements with improved mechanical stability. The use of endless fibers in the direction of the longitudinal axis of the carrier element makes it possible to realize essentially more stable carrier elements.

It can be considered a further advantage that a pultrusion method requires lower tool investment costs by contrast to an injection molding method. It is thus possible, for example, to utilize a production facility for producing carrier elements with different cross sections in that it is merely necessary to adapt one shaping element for the pultrusion. By contrast to this, for the injection molding method it is necessary to produce a new respective injection mold for each different type of carrier element, resulting in high investment costs.

The solution proposed here additionally has the advantage that it makes it possible to produce the reinforcing element entirely in an uninterrupted production line. This leads to a simplification of the entire process. In the ideal case, further steps for reworking the cut-to-length reinforcing element are no longer necessary.

In one exemplary embodiment, endless fibers are used in the pultrusion of the carrier element.

In one exemplary embodiment, glass and/or carbon and/or aramid and/or natural fibers are used.

In a further exemplary embodiment, for the pultrusion of the carrier element, as matrix use is made of a polyamide composition which is arranged around the fibers.

In a preferred refinement, use is made of a polyamide 6.

In a further exemplary refinement, use is made of a polyamide polymerized in situ.

In a first alternative exemplary embodiment, the adhesive is arranged on the carrier element before the pultruded carrier element is cut to length.

This has the advantage that it makes it possible to realize a compact and cost-optimized production line.

In a second alternative exemplary embodiment, the pultruded carrier element is cut to length before the adhesive is arranged on an outer side of the carrier element.

Such a sequence of the production method has the advantage that it allows greater design freedom in the further processes. For example, the cut-to-length carrier elements can be processed in all dimensions, this by contrast only being able to be realized with difficulty in a process with a continuous production line.

In principle, various adhesives may be used as adhesive.

In a first exemplary embodiment, the adhesive is a shape memory material.

Such shape memory materials are described in the publication WO 2019/145503 A1, for example.

In an exemplary refinement, the method comprises the following further step: pressing the adhesive to transfer the adhesive into a stressed state.

In an exemplary refinement, the adhesive is pressed by a roller.

In a further exemplary refinement, the adhesive is arranged on the carrier element before the carrier element is cut to length.

In a further exemplary refinement, the adhesive is pressed before the carrier element is cut to length.

The use of a shape memory material as adhesive has the advantage that it makes it possible to arrange and prepare the adhesive in a continuous production line. It is thus possible, for example, for the adhesive applied to the carrier element to be guided through a pressing station, in which rollers transfer the adhesive into a stressed state.

In an alternative embodiment, the adhesive is a non-expandable adhesive.

In an exemplary refinement, this non-expandable adhesive expands upon activation by less than ±20%, preferably by less than ±10%, particularly preferably by less than ±5%.

An exemplary commercially available material that can be used as such a non-expandable adhesive can be obtained under the trade name SikaPower®.

In a further exemplary embodiment, the adhesive is an expandable adhesive.

In an exemplary refinement, the expandable adhesive has an expansion rate of between 50% and 800%, preferably between 50% and 500%, particularly preferably between 100% and 400%.

An exemplary material that can be used as expandable adhesive can be obtained under the trade name SikaReinforcer®. An alternative material that can be used as expandable adhesive can be obtained under the trade name SikaBaffle®.

In a further exemplary embodiment, the adhesive is a non-expandable adhesive, an expandable material additionally being arranged under the adhesive.

In a preferred refinement, first of all the expandable material is arranged on the at least one outer surface of the carrier element, and then the non-expandable adhesive is arranged on the expandable material. Accordingly, lastly the expandable material is arranged between the carrier element and the non-expandable adhesive.

Such an arrangement makes it possible for the non-expandable adhesive to be pressed onto the structural element by the expandable material when it is activated, with the result that a connection can be established between the structural element and the carrier element.

As expandable material, use can be made, for example, of a material obtainable under the trade name SikaBaffle®. As non-expandable adhesive, use can be made in turn, for example, of a material obtainable under the trade name SikaPower®.

In one exemplary embodiment, the method comprises the following further step: extruding or overmolding an additional element onto the carrier element.

Providing such a step offers the advantage that a design option for the reinforcing element that is independent of the production direction of the pultrusion method is provided as a result. For example, it is thus possible to add an additional element that does not run along the longitudinal axis of the carrier element.

In an exemplary refinement, the carrier element has a different material than the additional element.

In an exemplary refinement, the additional element does not have any fibers, the carrier element comprising fibers in the longitudinal direction of the carrier element.

In an exemplary refinement, the additional element is extruded or overmolded onto the carrier element through a nozzle integrated in a production line, before the pultruded carrier element is cut to length.

In an alternative refinement, the additional element is extruded or overmolded onto the carrier element by a robot, after the pultruded carrier element is cut to length.

In one exemplary embodiment, the additional element is in the form of a rib and/or ribs, which extend(s) substantially transversely with respect to the longitudinal axis of the carrier element and which increase(s) the torsional rigidity and/or the flexural rigidity of the carrier element.

In one exemplary embodiment, the additional element is arranged in the form of a wall on at least one outer surface of the carrier element.

In a preferred refinement, this at least one wall delimits the adhesive in at least one direction on the outer surface of the carrier element.

Providing such a wall or such walls offers the advantage that the adhesive is mechanically protected as a result, before it is arranged in the structural element. For example, the risk of the adhesive being stripped or chipped off of the carrier element is thus reduced. Furthermore, such walls have the advantage that, when the adhesive is activated, expansion of the adhesive can be guided by the wall, or else, in the case of non-expandable adhesives, that its shape can be maintained.

In one exemplary embodiment, the additional element is in the form of at least one spacer.

In an exemplary refinement, this at least one spacer is in contact with the structural element, and thus defines a position of the reinforcing element relative to the structural element in at least one direction, in a use state of the reinforcing element.

In one exemplary embodiment, the additional element is in the form of an expandable element.

In an exemplary refinement, the expandable element acts as a seal in its expanded state.

In one exemplary embodiment, the additional element is extruded or overmolded onto the carrier element in multiple method steps and/or through multiple nozzles.

Such production in multiple method steps has the advantage that it makes it possible to ensure greater freedom with respect to materials and shapes.

In one exemplary embodiment, the additional element comprises polyamide.

In one exemplary embodiment, the additional element is extruded or overmolded around the carrier element, with the result that the additional element is aligned substantially transversely with respect to the longitudinal axis of the carrier element.

In one exemplary embodiment, the method comprises the following additional step: extruding or overmolding a second additional element onto the carrier element and/or onto the first additional element.

In an exemplary refinement, the first additional element has a different material than the second additional element.

In a further exemplary refinement, the first additional element has a different flexural rigidity and/or a different breaking load than the second additional element.

In one exemplary embodiment, the method comprises the following further step: bending the pultruded carrier element.

In this respect, the bending can be effected before or after the cutting to length.

Details and advantages of the invention will be described below on the basis of exemplary embodiments and with reference to schematic drawings, in which.

Figure 1A:
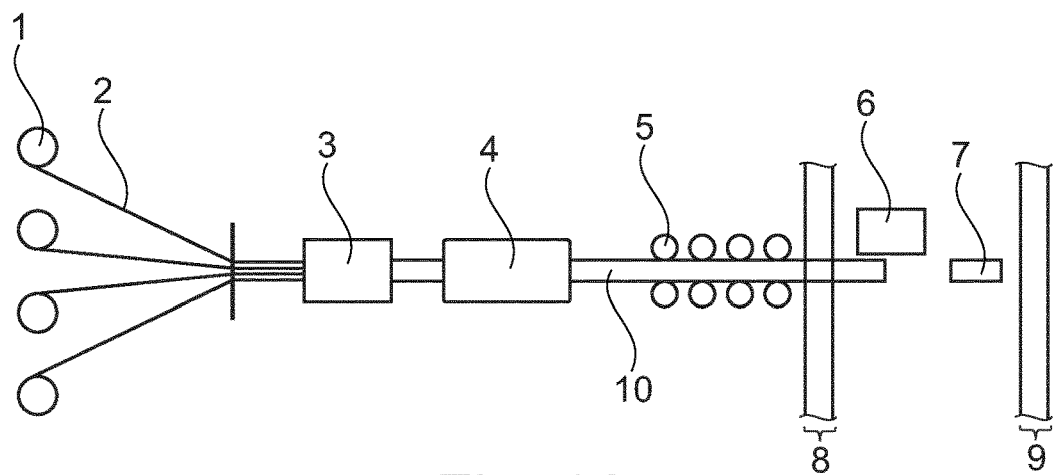
FIG. 1A shows an exemplary illustration of a pultrusion method.
Figure 1B:
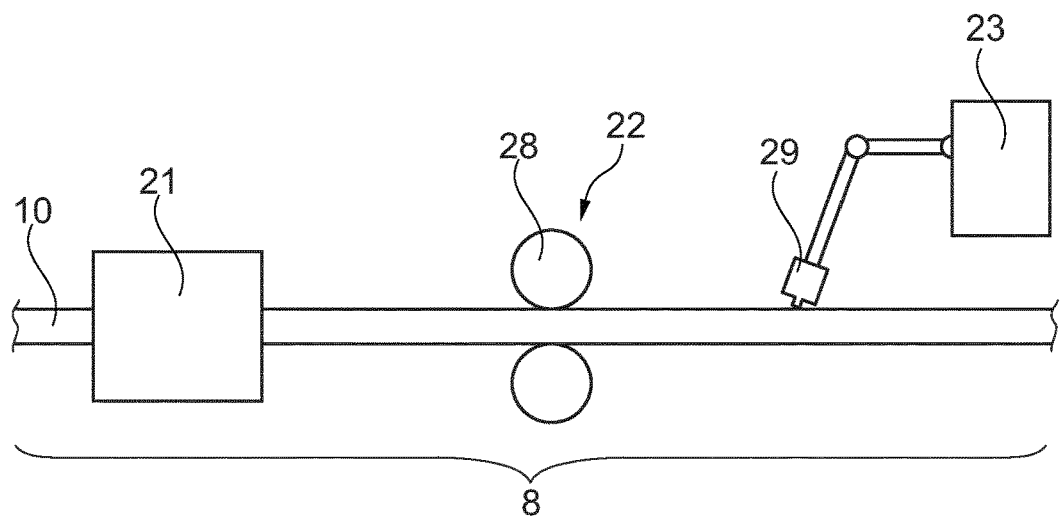
FIG. 1B shows an exemplary illustration of further stations in a pultrusion production line.
Figure 1C:
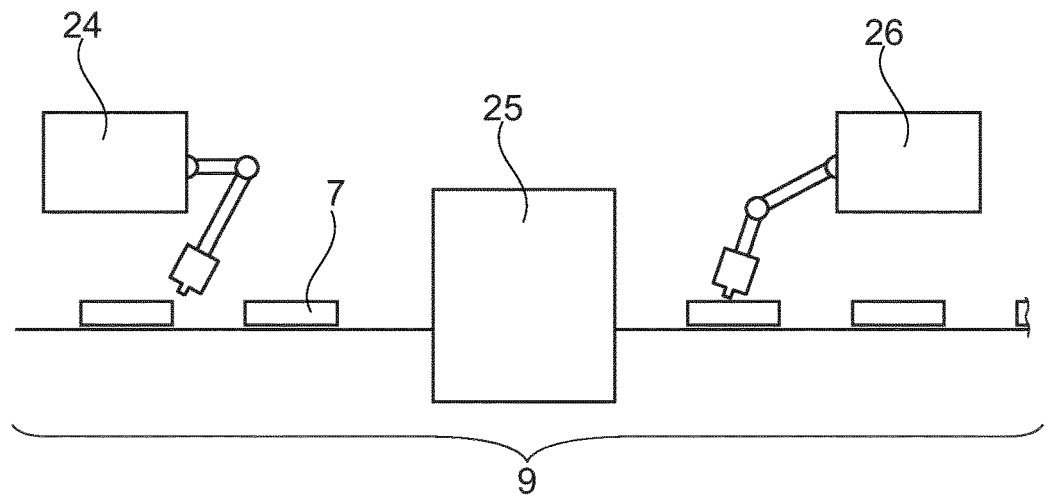
FIG. 1C shows an exemplary illustration of downstream stations.

FIG. 1A to 1C illustrate an exemplary method for producing a reinforcing element. In this respect, FIG. 1A shows an overview of such a method, and FIGS. 1b and 1C show further details of phases of this production method. In this respect, FIG. 1B schematically illustrates a phase within the production line with further stations, and FIG. 1C illustrates downstream stations that are not located in the primary production line of the pultrusion method.

According to FIG. 1A, in the course of the pultrusion, fibers 2 from fiber holding creels 1 first of all are guided through a resin tank 3. The profile 10 is then shaped and hardened in a hardening tool 4. A drawing tool 5 ensures that the fibers 2 are arranged under tension during these process steps. Accordingly, these steps result in the production of a profile 10 which serves as starting point for the carrier element. Lastly, a cutting-to-length station 6 subdivides the endlessly produced profile 10 into cut-to-length elements 7.

FIG. 1B schematically illustrates stations within the production line that are arranged in phase 8 in the overview according to FIG. 1A. In the exemplary embodiment, what is illustrated first of all is an adhesive application station 21. At this station, an adhesive is arranged onto the pultruded profile 10. In this exemplary embodiment, a shape memory material is used as adhesive. Furthermore, the adhesive is pressed by rollers 18 at a pressing station 22 and transferred into a stressed state. In addition, in this exemplary embodiment there is an extrusion station 23, from which an additional element can be extruded onto the profile 10 or the carrier element using a nozzle 29.

FIG. 1C schematically illustrates downstream stations that are arranged in phase 9 in the overview according to FIG. 1A. In this exemplary embodiment, there is a first downstream station 24, a second downstream station 25, and a third downstream station 26. What these downstream stations 24, 25, 26 have in common is that there is always a respective production step being performed there on a cut-to-length element 7 of the pultruded profile 10. For example, a first additional element can be extruded or overmolded onto the carrier element at the first downstream station 24. In the second downstream station 25, it is possible, for example, for the adhesive to be arranged on at least one outer surface of the carrier element. And in the third downstream station 26, it is possible, for example, for a second additional element to be extruded or overmolded onto the carrier element and/or onto the first additional element.

In order to produce a reinforcing element from the pultruded profile 10, it is possible, for example, for work to be done only with stations in the production line, or else work can be done only with downstream stations, or else work can be done both with stations in the production line and with downstream stations.

FIGS. 2 to 5 then illustrate, schematically and by way of example, reinforcing elements 16 that can be produced by a method according to FIG. 1A to 1C.

Figure 2:
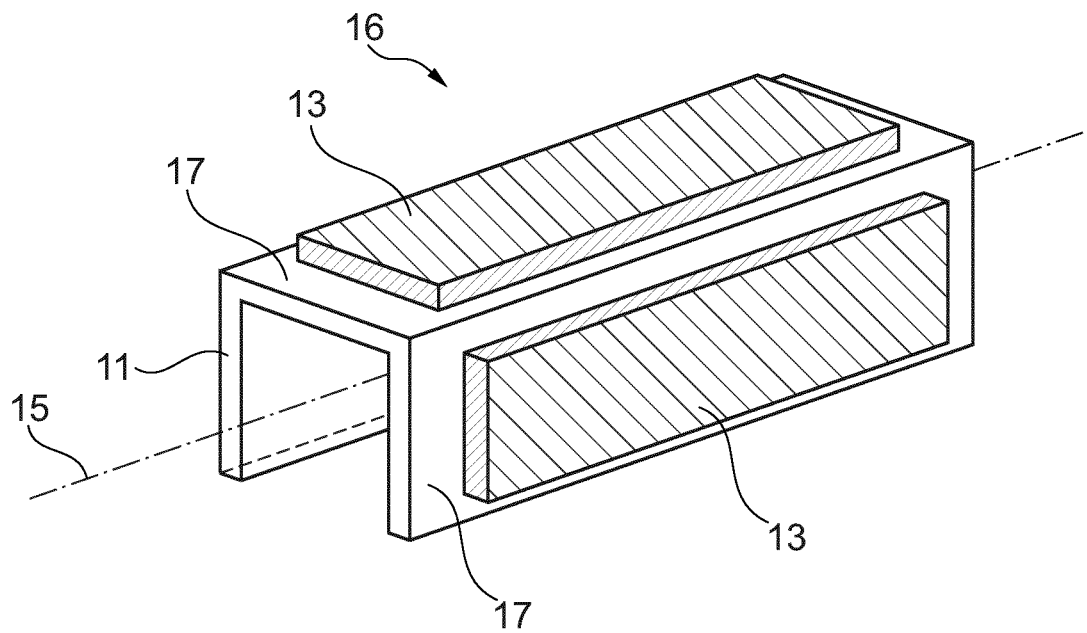
FIG. 2 shows an exemplary illustration of a reinforcing element illustrated in three dimensions.

FIG. 2 schematically illustrates a reinforcing element 16 by way of example. The reinforcing element 16 has a carrier element 11 that has a longitudinal axis 15. The carrier element 11 has multiple outer surfaces 17 extending in the direction of the longitudinal axis 15. An adhesive 13 is arranged on these outer surfaces 17. In this exemplary embodiment, the reinforcing element 16 does not have any further additional elements, such as ribs or walls or spacer elements.

Figure 3A:
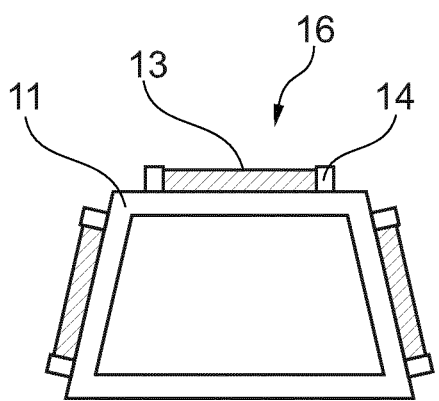
FIG. 3A to 3C show exemplary illustrations of cross sections through reinforcing elements.
Figure 3B:
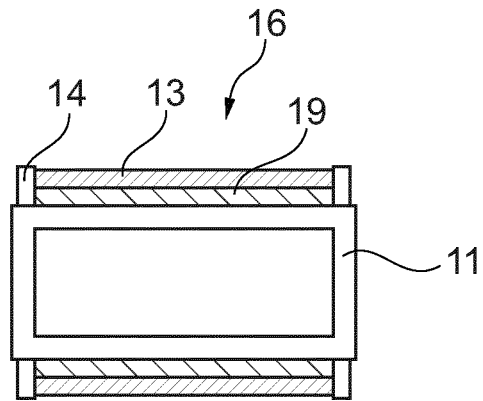
Figure 3C:
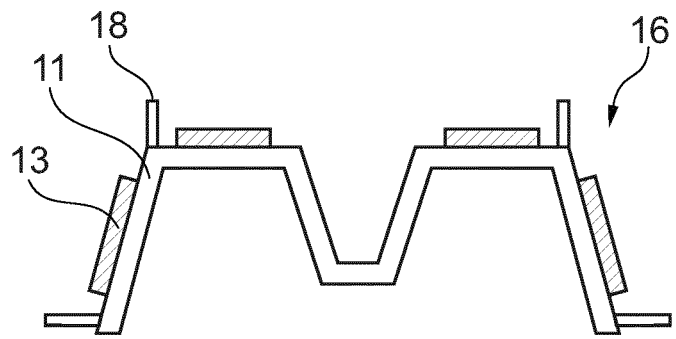

FIG. 3A to 3C schematically illustrate cross sections through exemplary reinforcing elements 16.

FIG. 3A illustrates a reinforcing element 16 with a trapezoidal cross section. The carrier element 11 has a respective adhesive 13, laterally terminated by walls 14, arranged on three outer surfaces. Such walls 14 are therefore advantageous, because on the one hand they protect the adhesive 13 against mechanical influences, and on the other hand they can ensure expansion of the adhesive 13 or dimensional stability of the adhesive 13 when the adhesive 13 is activated.

FIG. 3B schematically illustrates a further cross section of a further exemplary reinforcing element 16. In this exemplary embodiment, the carrier 11 has a rectangular cross section. In this exemplary embodiment, an expandable material 19 and an adhesive 13 arranged thereon is arranged on the two broader outer surfaces 17 of the carrier element 11. In this respect, the expandable material 19 and the adhesive 13 are in turn laterally terminated by walls 14. When the expandable material 19 and the adhesive 13 are activated, the adhesive 13 is pressed against an inner side of the structural element by the expansion of the expandable material 19.

FIG. 3C schematically illustrates a further exemplary cross section of a reinforcing element 16. In this exemplary embodiment, the carrier element 11 has an M-shaped, or W-shaped, cross section. A respective adhesive element 13 is arranged on four outer surfaces. In addition, this reinforcing element 16 has spacer elements 18, which define a spacing between the carrier element 11 and the structural element (not illustrated) in a use state of the reinforcing element 16.

Figure 4:
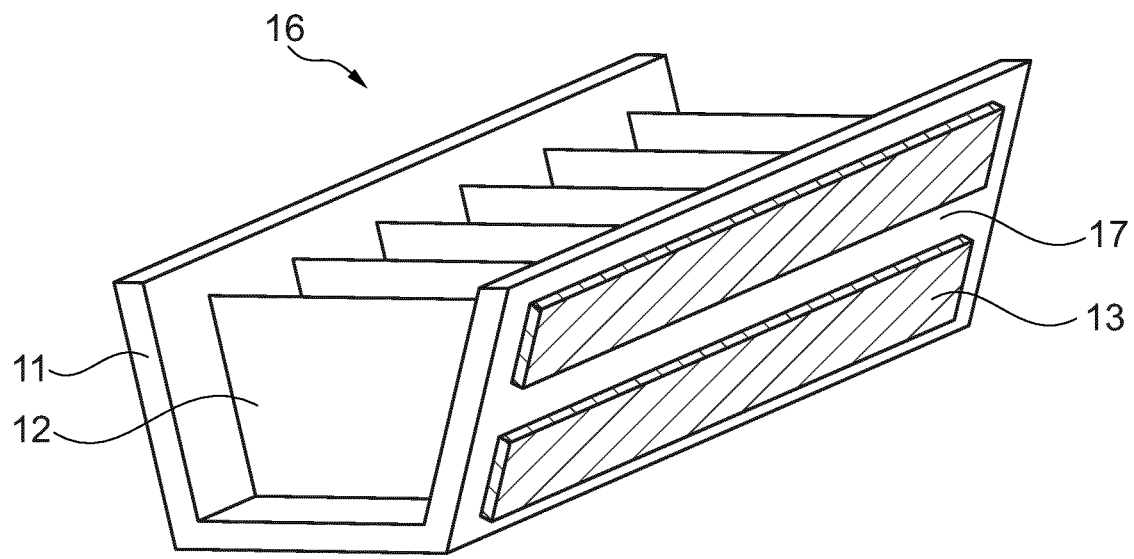
FIGS. 4 and 5 show exemplary illustrations of reinforcing elements illustrated in three dimensions.

FIG. 4 schematically shows an exemplary reinforcing element 16 illustrated in three dimensions. In this respect, the carrier element 11 has a substantially U-shaped cross section, and adhesive 13 is arranged on outer surfaces 17 of the carrier element. In this exemplary embodiment, the reinforcing element has additional elements in the form of ribs 12, which run transversely with respect to the longitudinal direction of the carrier element 11. Providing such ribs 12 increases the torsional rigidity and/or the flexural rigidity of the carrier element.

Figure 5:
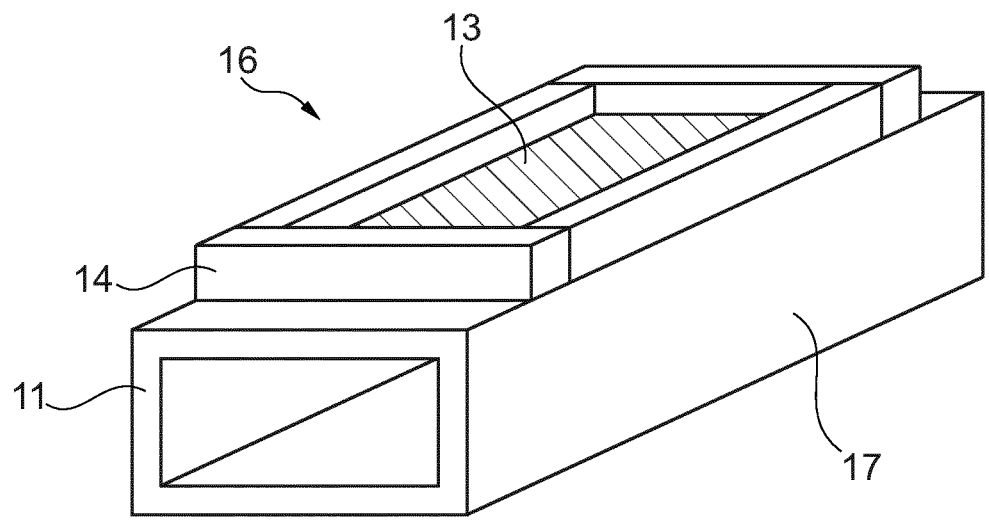

FIG. 5 now schematically shows a reinforcing element 16 illustrated in three dimensions. In this exemplary embodiment, the carrier element 11 has a rectangular cross section. An adhesive 13 is arranged on an outer surface 17 of the carrier element 11. In this exemplary embodiment, the adhesive 13 is delimited on all sides by walls 14.

LIST OF REFERENCE SIGNS

1 Fiber holding creel
2 Fiber
3 Resin tank
4 Hardening tool
5 Drawing tool
6 Cutting-to-length station
7 Cut-to-length element
8 Phase with stations in the production line
9 Phase with downstream stations
10 Endless profile
11 Carrier element
12 Rib
13 Adhesive
14 Wall
15 Longitudinal axis
16 Reinforcing element
17 Outer surface
18 Spacer element
19 Expandable material
21 Adhesive application station
22 Pressing station
23 Extrusion station
24 First downstream station
25 Second downstream station
26 Third downstream station
28 Roller
29 Nozzle

The invention claimed is:

1. A method for producing a reinforcing element for reinforcing a structural element in a motor vehicle, the method comprising:
   pultruding a carrier element, which has a longitudinal axis extending along a longitudinal axis of the structural element in a use state, wherein the carrier element has multiple outer surfaces extending in the direction of the longitudinal axis;
   arranging an adhesive on at least one outer surface of the carrier element;
   cutting the pultruded carrier element to length; and
   extruding or overmolding an additional element onto the carrier element, wherein the additional element is in the form of at least one wall on at least one outer surface of the carrier element, and the wall delimits the adhesive in at least one direction on the outer surface.

2. The method as claimed in claim 1, further comprising:
   pressing the adhesive to transfer the adhesive into a stressed state.

3. The method as claimed in claim 2, wherein the adhesive is pressed by a roller.

4. The method as claimed in claim 1, wherein the adhesive is on the carrier element before the carrier element is cut to length, and/or the adhesive is pressed before the carrier element is cut to length.

5. The method as claimed in claim 1, wherein the additional element is extruded or overmolded onto the carrier element through a nozzle integrated in a production line, before the pultruded carrier element is cut to length as an in-line process.

6. The method as claimed in claim 1, wherein the additional element is extruded or overmolded onto the carrier element by a downstream station, after the pultruded carrier element is cut to length.

7. The method as claimed in claim 1, wherein the additional element is extruded or overmolded onto the carrier element in multiple steps and/or through multiple nozzles.

8. The method as claimed in claim 1, wherein the additional element comprises polyamide.

9. The method as claimed in claim 1, wherein the additional element is extruded or injection molded around the carrier element so that the additional element is aligned substantially transversely with respect to the longitudinal axis of the carrier element.

10. The method as claimed in claim 1, further comprising:
    extruding or overmolding a second additional element onto the carrier element and/or onto the additional element.

11. A method for producing a reinforcing element for reinforcing a structural element in a motor vehicle, the method comprising:
    pultruding a carrier element, which has a longitudinal axis extending along a longitudinal axis of the structural element in a use state, wherein the carrier element has multiple outer surfaces extending in the direction of the longitudinal axis;
    arranging an adhesive on at least one outer surface of the carrier element, wherein the adhesive is a shape memory material;
    cutting the pultruded carrier element to length; and
    extruding or overmolding an additional element onto the carrier element, wherein the additional element comprises at least one wall on at least one outer surface of the carrier element, and the wall delimits the adhesive in at least one direction on the outer surface.

* * * * *